United States Patent
Lahr (10) Patent No.: US 12,199,253 B2
(45) Date of Patent: Jan. 14, 2025

(54) LAMINATED THERMAL BARRIER FOR ANISOTROPIC HEAT TRANSFER

(71) Applicant: GM GLOBAL TECHNOLOGY OPERATIONS LLC, Detroit, MI (US)

(72) Inventor: Derek F. Lahr, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 595 days.

(21) Appl. No.: 17/519,783

(22) Filed: Nov. 5, 2021

(65) Prior Publication Data

US 2023/0141131 A1   May 11, 2023

(51) Int. Cl.
| | |
|---|---|
| *H01M 10/653* | (2014.01) |
| *H01M 10/613* | (2014.01) |
| *H01M 10/617* | (2014.01) |
| *H01M 10/625* | (2014.01) |
| *H01M 10/647* | (2014.01) |
| *H01M 10/6551* | (2014.01) |
| *H01M 10/6554* | (2014.01) |
| *H01M 10/6555* | (2014.01) |
| *H01M 10/6556* | (2014.01) |
| *H01M 10/658* | (2014.01) |
| *H01M 50/209* | (2021.01) |

(52) U.S. Cl.
CPC ....... *H01M 10/653* (2015.04); *H01M 10/613* (2015.04); *H01M 10/617* (2015.04); *H01M 10/625* (2015.04); *H01M 10/647* (2015.04); *H01M 10/6551* (2015.04); *H01M 10/6554* (2015.04); *H01M 10/6555* (2015.04); *H01M 10/6556* (2015.04); *H01M 10/658* (2015.04); *H01M 50/209* (2021.01)

(58) Field of Classification Search
None
See application file for complete search history.

(56) References Cited

U.S. PATENT DOCUMENTS

| | | | | |
|---|---|---|---|---|
| 4,214,952 A | * | 7/1980 | Sato | C25D 21/10 205/148 |
| 2012/0261107 A1 | * | 10/2012 | Prinz | H01M 10/613 165/185 |
| 2015/0303426 A1 | * | 10/2015 | Kim | H01M 50/126 156/580.2 |
| 2017/0200991 A1 | * | 7/2017 | Nam | H01M 10/625 |
| 2017/0365894 A1 | * | 12/2017 | Kwon | H01M 50/211 |
| 2018/0248238 A1 | * | 8/2018 | Pinon | H01M 10/613 |
| 2019/0214618 A1 | * | 7/2019 | Nakamura | H01M 10/6235 |
| 2022/0320626 A1 | * | 10/2022 | Ando | B32B 5/32 |

\* cited by examiner

*Primary Examiner* — Ula C Ruddock
*Assistant Examiner* — Mary Grace Byram (57) ABSTRACT

A heat transfer system includes first and second battery cells, a heat sink, and a plurality of sheets of a thermally conductive material arranged in a stack. The first and second battery cells are arranged adjacent to each other. The heat sink is arranged adjacent to the first and second battery cells. A first portion of the stack is disposed between the first and second battery cells. A second portion of the stack is disposed adjacent to and in thermal communication with the heat sink. The first portion of the stack conducts heat from the first battery cell while limiting heat conducted to the second battery cell. The second portion of the stack transfers the heat to the heat sink.

20 Claims, 6 Drawing Sheets

LAMINATED THERMAL BARRIER FOR ANISOTROPIC HEAT TRANSFER

INTRODUCTION

The information provided in this section is for the purpose of generally presenting the context of the disclosure. Work of the presently named inventor, to the extent it is described in this section, as well as aspects of the description that may not otherwise qualify as prior art at the time of filing, are neither expressly nor impliedly admitted as prior art against the present disclosure.

The present disclosure relates to a laminated thermal barrier for anisotropic heat transfer.

Vehicles such as electric vehicles and hybrid vehicles propel the vehicles using electric motors and battery systems. The battery systems include one or more battery packs, each including one or more battery modules. Each of the battery modules includes multiple battery cells that are connected in series, parallel, and/or combinations thereof.

In these battery systems, thermal runaway occurs when heat generated by one or more battery cells exceeds heat dissipated to the surroundings. For example, thermal runaway occurs when a temperature of a battery cell increases due to a failure within the battery system. Elevated temperatures cause exothermic decomposition of materials in the battery cell. Eventually, a self-heating rate of the battery cell becomes greater than a rate at which heat can be dissipated to the surroundings. The temperature of the battery cell rises exponentially, and stability is ultimately lost, which results in all remaining thermal and electrochemical energy being released to the surroundings.

If not prevented, the thermal runaway worsens. The internal temperature of the battery system continues to rise, which causes the current of the battery system to increase, creating a domino effect. The increase in temperature in a single battery cell begins to adversely impact other battery cells in close proximity, and the pattern continues and spreads to neighboring battery cells, which is called thermal runaway propagation. The thermal runaway can propagate not only to the battery cells in a battery module but can also propagate across multiple battery modules in a battery pack, and further to neighboring battery packs in the battery system.

SUMMARY

A heat transfer system comprises first and second battery cells, a heat sink, and a plurality of sheets of a thermally conductive material arranged in a stack. The first and second battery cells are arranged adjacent to each other. The heat sink is arranged adjacent to the first and second battery cells. A first portion of the stack is disposed between the first and second battery cells. A second portion of the stack is disposed adjacent to and in thermal communication with the heat sink. The first portion of the stack conducts heat from the first battery cell while limiting heat conducted to the second battery cell. The second portion of the stack transfers the heat to the heat sink.

In another feature, the sheets are configured to provide a higher thermal contact resistance in the first portion of the stack than in the second portion of the stack.

In another feature, the first portion of the stack is configured to function as a thermal insulator across a thickness of the first portion of the stack and as a thermal conductor in a direction perpendicular to the thickness of the first portion of the stack.

In another feature, portions of the sheets in the first portion of the stack have a greater surface roughness than portions of the sheets in the second portion of the stack.

In another feature, portions of the sheets in the first portion of the stack are coated with a material that is thermally insulating or that increases contact resistance of the sheets in the first portion, and portions of the sheets in the second portion of the stack are not coated with the material or are coated with another material that decreases contact resistance of the sheets in the second portion.

In another feature, the heat transfer system further comprises one or more sheets of a thermally insulating material disposed between two or more of the sheets in the first portion of the stack. The second portion of the stack does not include any thermally insulating material between the sheets.

In another feature, the sheets in the second portion of the stack are arranged in a staggered manner with a portion of each of the sheets contacting the heat sink.

In another feature, the sheets in the second portion of the stack are joined together, and the joint is attached to the heat sink.

In another feature, the heat transfer system further comprises a layer of a thermally conductive paste disposed between the heat sink and at least a portion of at least one of the sheets in the second portion.

In another feature, the sheets are made of two or more different materials with relative positions of the sheets made of the two or more different materials in the stack being of any combination.

In another feature, the second portion of the stack is compressed with a greater force than the first portion of the stack.

In another feature, the material includes an anodized coating.

In another feature, the thermally insulating material includes a porous material.

In another feature, the two or more different materials include first and second metals.

In another feature, the two or more different materials include a metal and a non-metal.

In another feature, one or more of the sheets closer to the first battery cell are made of a material having a lower thermal conductivity than one or more of the sheets farther from the first battery cell.

In another feature, the first and second battery cells are arranged in a battery module along a first axis. The heat sink extends along the first axis. The first portion of the stack extends along a second axis that is perpendicular to the first axis. The second portion of the stack extends along the first axis.

In another feature, the first portion of the stack has a higher thermal contact resistance along the first axis than along the second axis.

In another feature, the first portion of the stack conducts more heat along the second axis than along the first axis.

In another feature, the heat sink is arranged on a first side of the first and second battery cells. The heat transfer system further comprises a second heat sink. The second heat sink is arranged on a second side of the first and second battery cells that is opposite to the first side. The stack of the sheets further comprises a third portion that is disposed between the second heat sink and at least one of the first and second battery cells. The third portion of the stack transfers the heat conducted by the first portion of the stack from the first battery cell to the second heat sink.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Typically, thermal runaway propagation is prevented by employing barriers formed using thick layers of aerogel insulation. The aerogel insulation is not only expensive but the thickness of the aerogel insulation layers precludes the use of the barriers between every battery cell. Accordingly, the barriers are placed between two battery cells after every $N^{th}$ battery cell, where N is an integer typically greater than 3, which is insufficient to completely prevent thermal runaway propagation. A metallic heat sink/heat transfer plate is arranged adjacent to the barriers, which is relatively less effective for removing heat.

The present disclosure provides a heat removal system that prevents thermal runaway propagation using more compact and efficient material than aerogel insulation. The heat removal system provides both insulating and conducting properties. Specifically, the heat removal system prevents heat transfer between the battery cells by providing insulation between the battery cells. Additionally, the heat removal system conducts heat from the battery cells and transfers the conducted heat to a cooling plate attached to the heat removal system.

The heat removal system uses a stack of multiple thin conductive sheets placed between the battery cells. As explained below in detail, a thermal contact resistance provided by the stack between the battery cells provides a highly effective insulator in a through-plane direction (i.e., across the thickness of the stack and between the battery cells) while maintaining high in-plane conductivity (i.e., in a plane parallel to the length of the stack and parallel to the height of the battery cells). The thermal insulating properties are provided by the contact resistance across the thickness of the stack.

The contact resistance is created by stacking multiple sheets of a conducting material. When enough number of the conductive sheets are stacked, the sum of all the contact resistances becomes very high, simulating a highly effective insulator. However, because the sheets are highly conductive, the stack of the sheets still carries a significant amount of heat in the in-plane direction from the battery cell to the cooling plate. Furthermore, as explained below, the stack is constructed such that the stack has a relatively high contact resistance between the battery cells and a relatively low contact resistance where the stack is joined with the cooling plate/heat sink.

By using the stack of thin sheets, the heat removal system occupies a smaller area relative to the barriers formed using thick layers of aerogel insulation. The material used to form the heat removal system is less expensive than the aerogel insulation. Thus, the heat removal system provides better protection for neighboring battery cells against thermal runaway propagation relative to the barriers formed using thick layers of aerogel insulation.

More specifically, the heat removal system comprises a thermal barrier formed using a stack of thin sheets made of a highly conductive material. Non-limiting examples of the conductive material include metals, alloys, composites, and any combination thereof. First portions of the conductive sheets are stacked between the battery cells and have a relatively high surface roughness to increase a contact resistance between the conductive sheets. Second portions of the conductive sheets are stacked and connected to a heat sink and have a relatively low surface roughness to decrease the contact resistance between the conductive sheets. For example, the conductive sheets may be creased/wrinkled to reduce the contact area (i.e., to increase contact resistance) between the conductive sheets in the first portions when the conductive sheets are compressed between the battery cells. In the second portions, the contact area increases (i.e., contact resistance decreases) between the conductive sheets due to higher compression used between the heat sink and the cells than between the battery cells.

Optionally, the first portions of the conductive sheets may be coated with a thin thermally insulating layer. For example, the insulating layer may include an anodized coating. Alternatively, insulating sheets of a thermally insulating material may be placed in between the first portions of the conductive sheets at any interval. The insulating sheets may include a solid pattern or a pattern with holes.

The conductive sheets are made to conduct heat away from a first mass (e.g., a first battery cell) to a second mass (e.g., a heat sink or a cooling plate), while protecting a third mass (e.g., a second battery cell adjacent to the first battery cell) from heat generated by the first mass. The conductive sheets are compressed tightly together where the conductive sheets contact the second mass to promote heat transfer. Alternatively, the conductive sheets are welded together where the conductive sheets join the second mass to promote heat transfer. The conductive sheets may use a conductive paste where the conductive sheets are joined together with the second mass to promote heat transfer through the thickness of the conductive sheets at the location of the joint. The conductive sheets may be staggered where the conductive sheets join the second mass to promote heat transfer so that a portion of each conductive sheet contacts the second mass. The conductive sheets may be made up of multiple types of materials. Surface treatments can also be applied to the various portions of each individual conductive sheet. These and other features of the heat removal system of the present disclosure are described below in detail.

Throughout the present disclosure, a battery system is used only as an example to illustrate an application of the heat removal system. The heat removal system of the present disclosure can be used in any application where heat generated by one mass can adversely affect a neighboring mass, which in turn can cause a domino effect in other neighboring masses. The heat removal system of the present disclosure can be used to prevent similar heat propagation in any application.

Figure 1A:
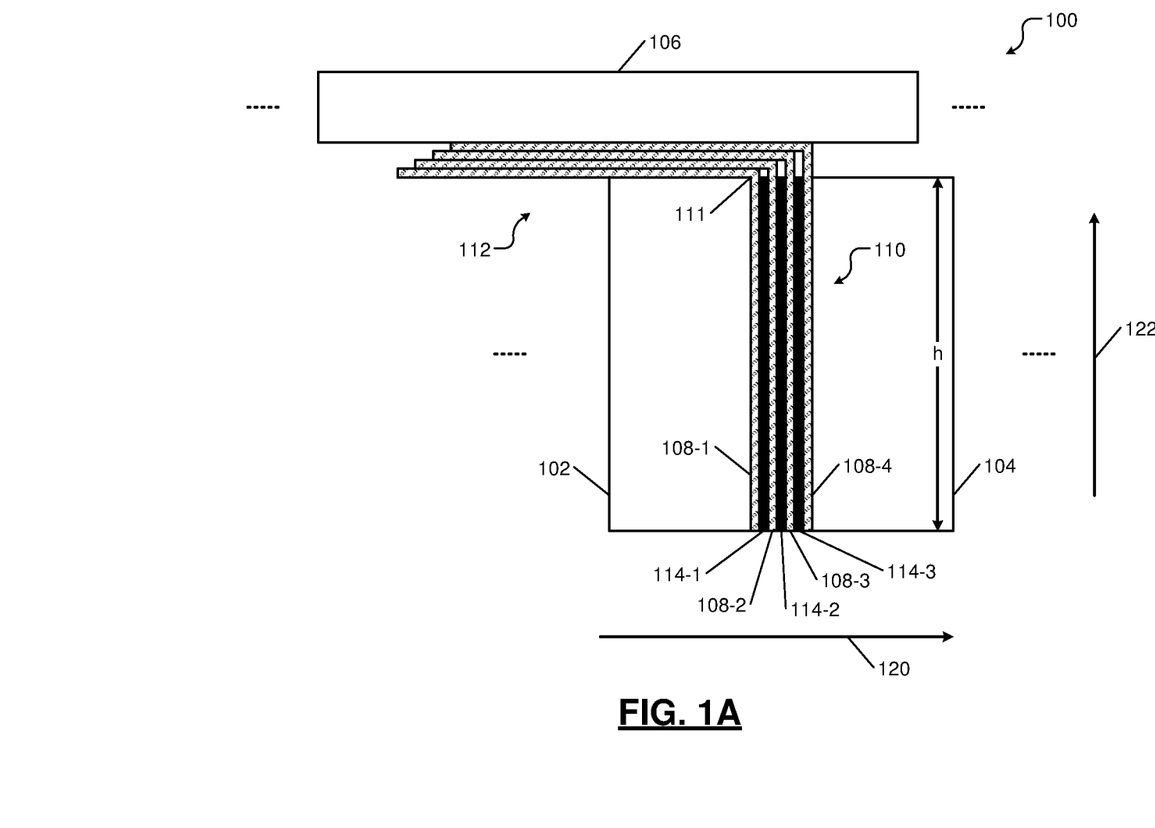
FIGS. 1A and 1B show examples of a system for removing heat from one or more battery cells of a battery module using a stack of sheets of thermally conductive material disposed between the cells and a heat sink.
Figure 1B:
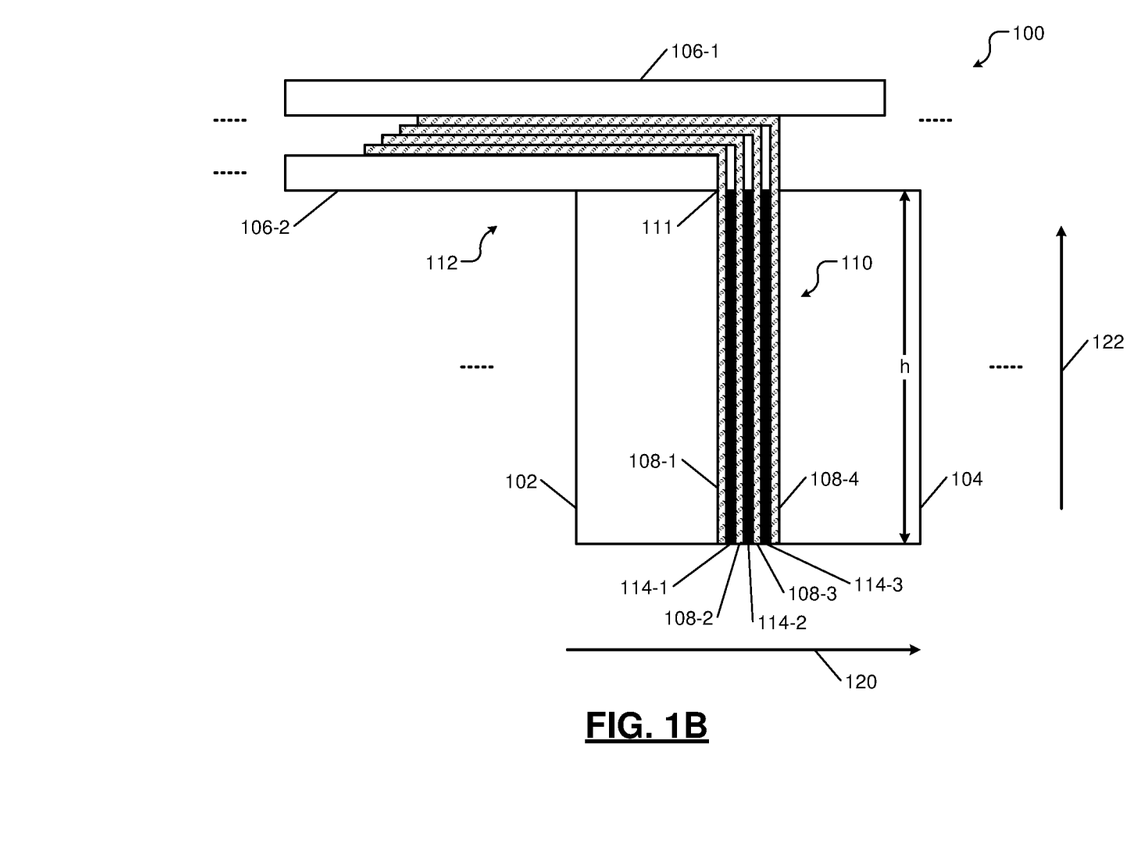

FIGS. 1A and 1B show examples of a heat removal system 100 according to the present disclosure. In FIG. 1A, a side cross-sectional view of the heat removal system 100 is shown. For example, the heat removal system 100 is installed in a battery module of which only two battery cells, a first battery cell 102 and a second battery cell 104, are shown for illustrative purposes. Hereinafter, for convenience, the first and second battery cells 102, 104 are simply called the cells 102, 104; and it is understood that the cells 102, 104 are located in a battery module of a battery pack.

Suppose that the cell 102 is experiencing thermal runaway, and the cell 104 that is neighboring or adjacent to the cell 102 is functioning normally (i.e., the cell 104 is not generating an abnormal amount of heat). The heat removal system 100 conducts heat from the cell 102 and transfers the conducted heat to a heating sink (or a cooling plate) 106. The heat removal system 100 prevents the heat from the cell 102 from flowing to the neighboring cell 104 and causing thermal runaway.

The heat removal system 100 comprises a plurality of sheets 108-1, 108-2, 108-3, and 108-4 (collectively the sheets 108) made of a thermally conductive material. Only four sheets 108 are shown for example only. Fewer or more than four sheets 108 can be used instead. The sheets 108 are made of a highly thermally conductive material. For example, the sheets 108 can be made of a metal or an alloy. Alternatively, the sheets can be made of a composite material. In some examples, one set of the sheets 108 can be made of a first conductive material (e.g., a metal), and another set of the sheets 108 can be made of a second conductive material (e.g., a composite material).

In some examples, at least one of the sheets 108 closest to the cell 102 (e.g., sheet 108-1, or sheets 108-1 and 108-2) can be made of a first conductive material, and the remaining sheets 108 can be made of a second conductive material having a higher thermal conductivity than the first conductive material. Many other permutations and combinations of conductive materials can be used to make the sheets 108.

The sheets 108 are stacked together and are disposed between the two adjacent cells 102, 106. The sheets 108 include two portions: a first portion 110 of the sheets 108 is compressed between the cells 102, 104; and a second portion 112 of the sheets 108 is disposed and compressed between the heat sink 106 and the top of the cell 102 as shown. The first portion 110 of the sheets 108 extends from the bottom of the cells 102, 104 to the top of the cells 102, 104. The first portion 110 of the sheets 108 is compressed between the cells 102, 104. The second portion 112 of the sheets 108 extends beyond the first portion 110 and is folded at about right angle over the top of the cell 102 as shown at 111.

The first and second portions 110, 112 are continuous; that is, the sheets 108 in the first and second portions 110, 112 are simply folded to form the first and second portions 110, 112 but are otherwise continuous. Alternatively, the first and second portions 110, 112 can be two separate portions of the sheets 108 that are joined together at 111. The first and second portions 110, 112 of the sheets 108 are designated as such so that the different properties and structural details of the sheets 108 in the first and second portions 110, 112 can be described by conveniently referencing the two portions.

The heat sink 106, which includes a cooling plate, compresses the second portion 112 of the sheets 108 between the heat sink 106 and the top of the cell 102 (and may be another cell neighboring the cell 102 on the opposite side of the cell 104, not shown). The heat sink 106 compresses the second portion 112 of the sheets 108 with a much greater force than the force with which the first portion 110 of the sheets 108 is compressed between the cells 102, 104. Alternatively, as shown in FIG. 1B, the heat sink 106 may include two layers 106-1 and 106-2, and the second portion 112 of the sheets 108 is compressed between the two layers 106-1 and 106-2 of the heat sink 106. Note that the heat sink 106 can include a cooling or heating plate in a battery pack. Alternatively, a portion of the battery pack can serve as the heat sink 106. Further, neighboring cells can also serve as the heat sink 106.

In FIG. 1A, in the first portion 110, the sheets 108 provide a thermal contact resistance in a through-plane direction 120 (i.e., along a plane extending across the thickness of the sheets 108 in the first portion 110 between the cells 102, 104). The contact resistances of the sheets 108 connect in series. Depending on the number of the sheets 108 stacked and compressed together, a sum of all of the contact resistances of the sheets 108 in the first portion 110 becomes very high in proportion to the number of sheets 108 used. As a result, the first portion 110 of the sheets 108 functions like a highly effective thermal insulator that prevents heat from the cell 102 from transferring to the cell 104. The insulating effect of the first portion 110 of the sheets 108 can be enhanced further by coating the sheets 108 in the first portion 110 with an insulating material or by using layers of an insulating material between the sheets 108 in the first portion 110 of the sheets 108 as described below in detail.

While the first portion 110 of the sheets 108 functions as a highly effective thermal insulator between the cells 102, 104, the sheets 108 themselves are made of a highly conductive material. Therefore, the sheets 108 maintain high conductivity in an in-plane direction 122 (i.e., in a plane parallel to the length of the stack of the sheets 108 and parallel to the height of the cells 102, 104). In general, the through-plane direction 120 can be called a horizontal direction, and the in-plane direction 122, which is perpendicular to the through-plane direction 120, can be called a vertical direction. The first portion 110 of the stack functions as a thermal insulator across a thickness of the first portion 110 of the stack (i.e., in the horizontal direction) and as a thermal conductor in a direction perpendicular to the thickness of the first portion 110 of the stack (i.e., in the vertical direction).

Further, the second portion 112 of the sheets 108 does not include any insulating coating or insulating material between the sheets 108. Instead, the sheets 108 in the second portion 112 are connected to the heat sink 106 in one or more ways described below to reduce contact resistance between the sheets 108 in the second portion 112 and to enhance heat transfer between the sheets 108 in the second portion 112 and the heat sink 106. Accordingly, the sheets 108 provide a lower thermal contact resistance in the second portion 112 of the stack than in the first portion 110 of the stack. The heat conducted from the cell 102 by the sheets 108 in the first portion 110 is readily transferred from the sheets 108 in the second portion 112 to the heat sink 106.

Optionally, the sheets 108 may be coated with an insulating material. For example, the sheets 108 may be coated with the insulating material or a material that can increase the contact resistance of the sheets 108 only in the first portion 110 of the stack. The sheets 108 in the second portion 112 of the stack are not coated with the insulating material. Alternatively, a plurality of layers 114-1, 114-2, and 114-3 (collectively the layers 114) of an insulating material can be disposed between the sheets 108 in the first portion 110. The layers 114 are not disposed between the sheets 108 in the second portion 112. The sheets 108 in the second portion 112 of the stack may be coated with materials that reduce contact resistance of the sheets 108 in the second portion 112 of the stack.

The presence of the insulating material (coating or the layers 114) in the first portion 110 of the sheets 108 further increases the contact resistance of the sheets 108 in the first portion 110, which in turn prevents heat transfer from the cell 102 to the cell 104. The absence of the insulating material (coating or the layers 114) in the second portion 112 of the sheets 108 and optional use of a coating that reduces contact resistance of the sheets 108 in the second portion 112 allow heat conducted by the sheets 108 from the cell 102 to be readily transferred to the heat sink 106. Note that while the layers 114 are shown between every pair of the sheets 108 in the first portion 110, the layers 114 can be disposed in any other manner. The coating and the layers 114 are shown and described in further detail with reference to FIGS. 4 and 5.

Figure 2:
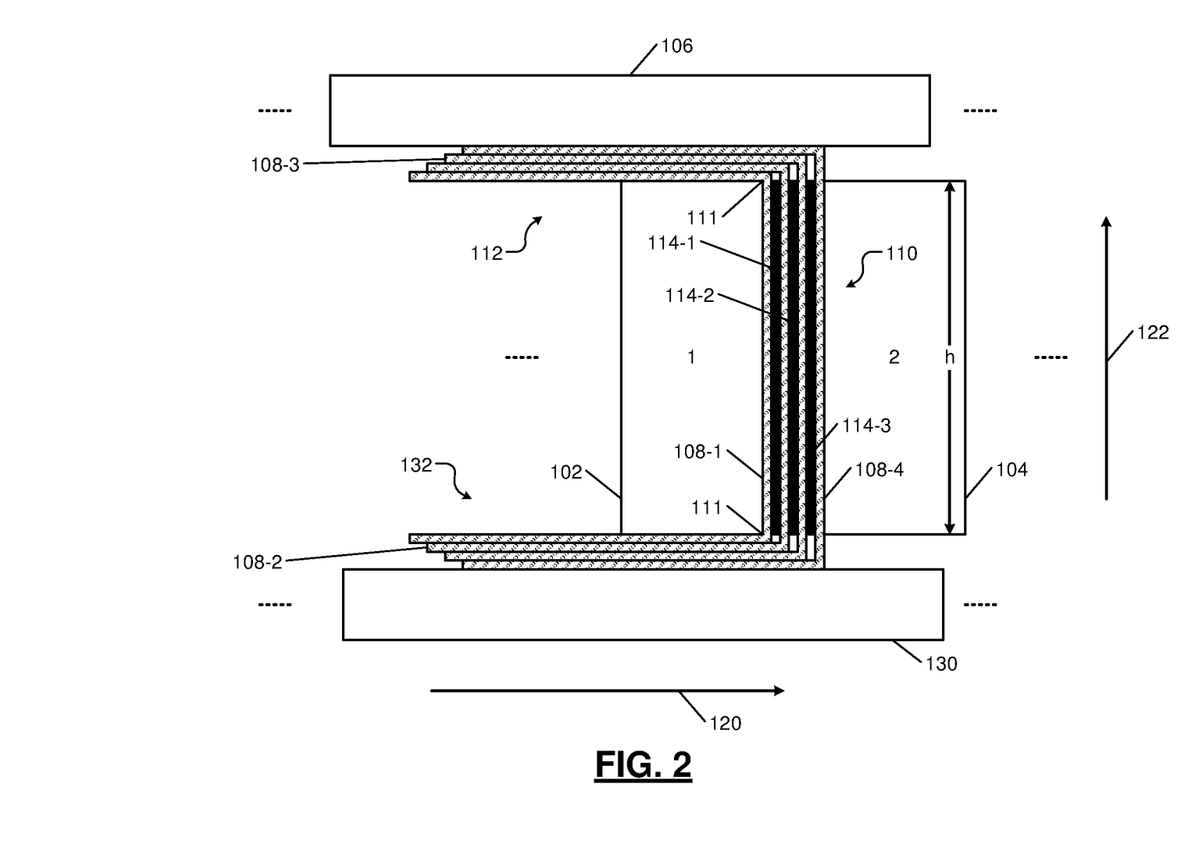
FIG. 2 shows the system of FIG. 1A with an additional heat sink and with an additional portion of the stack of sheets disposed between the battery cells and the additional heat sink.

FIG. 2 is similar to FIG. 1A except that FIG. 2 shows an additional heat sink 130 at the bottom of the cells 102 (Cell 1), 104 (Cell 2). The heat sink 130 is parallel to the heat sink 106, both of which are parallel to the through-plane direction 120. In FIG. 2, the sheets 108 include a third portion 132 that is structurally similar to the second portion 112 in all respects. Therefore, the third portion 132 of the sheets 108 is not described in further detail for brevity. The third portion 132 transfers heat conducted by the first portion 110 of the sheets 108 from the cell 102 to the heat sink 130 in the same manner as the second portion 112 of the sheets 108 transfers the heat conducted by the first portion 110 of the sheets 108 from the cell 102 to the heat sink 106 as described above. Note that as shown in FIG. 1B, the heat sink 130 may also include two layers, and the third portion 132 can be compressed between the two layers of the heat sink 130. Further, the heat sink 130 can also include a cooling or heating plate in a battery pack. Alternatively, a portion of the battery pack can serve as the heat sink 130. Further, neighboring cells can also serve as the heat sink 130.

Figure 3A:
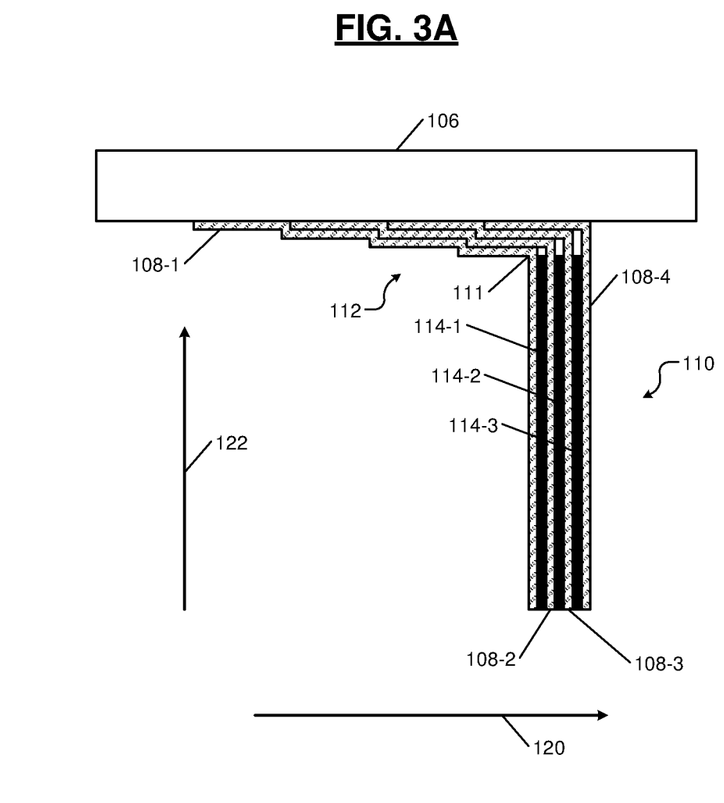
FIG. 3A shows an example of attaching portions of the sheets to the heat sink in a staggered manner.
Figure 3B:
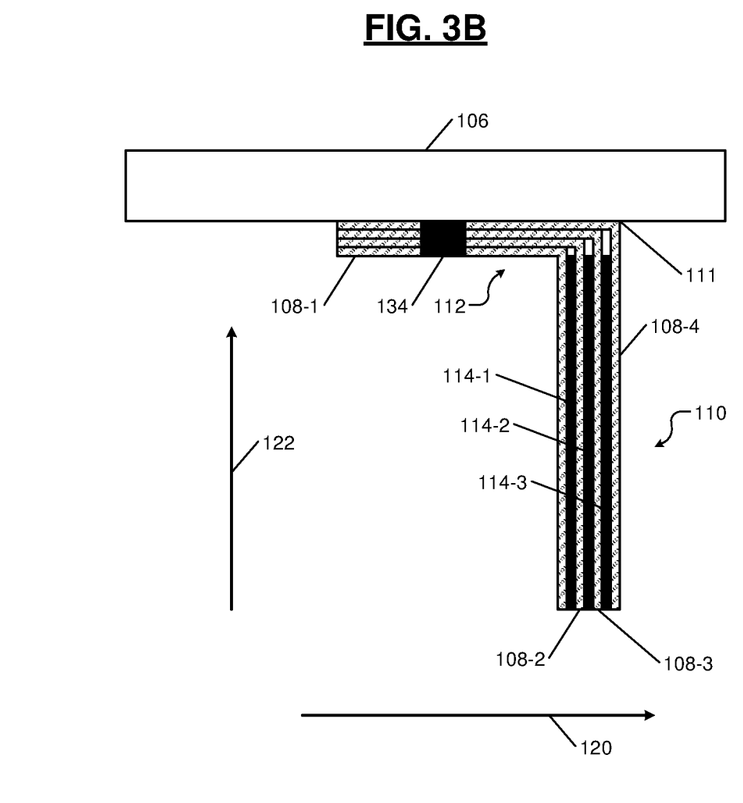
FIG. 3B shows an example of joining portions of the sheets near the heat sink and attaching the joined portions of the sheets to the heat sink.

FIGS. 3A and 3B show different ways in which the sheets 108 in the second portion 112 can be connected to each other and to the heat sink 106. In FIGS. 3A and 3B, partial side cross-sectional views of the heat removal system 100 are shown without the cells 102, 104. The cells 102, 104 are omitted to focus on the different ways in which the sheets 108 in the second portion 112 can be connected to each other and to the heat sink 106.

Note that the sheets 108 in the third portion 132 (shown in FIG. 2) can be connected to each other and to the heat sink 130 (shown in FIG. 2) in the same manner. In FIGS. 3A and 3B, the layers 114 are shown for completeness. The layers 114 can be arranged differently or omitted altogether as already described above. Further, the description of other features such as surface treatment and surface roughness of the sheets 108 in the first and second portions 110, 112 provided elsewhere applies equally to the elements shown and described below with reference to FIGS. 3A and 3B.

In FIG. 3A, in the second portion 112, the sheets 108 are arranged in a staggered manner as shown. In the staggered or staircase-like arrangement shown, at least a portion of each of the sheets 108 in the second portion 112 is connected to the heat sink 106. In addition, all of the sheets 108 in the second portion 112 contact each other. As already described above, the sheets 108 in the second portion 112 are neither coated with nor separated by any insulating material. Instead, as described below, the sheets 108 in the second portion 112 may have a surface roughness less than that of the sheets 108 in the first portion 110. As a result, the contact resistance of the sheets 108 in the second portion 112 is much less than the contact resistance of the sheets 108 in the first portion 110. The layered manner of arranging the sheets 108 shortens the path for heat transfer in the through-plane direction 120 for more of the sheets 108 in the second portion 112. Therefore, the sheets 108 in the second portion 112 readily transfer the heat, which is conducted from the cell 102 by the sheets 108 in the first portion 110, to the heat sink 106.

Further, a thermally conductive paste may be used between the heat sink 106 and the portions of the sheets 108 in the second portion 112 that contact the heat sink 106. The thermally conductive paste further enhances the heat transfer from the sheets 108 in the second portion 112 to the heat sink 106.

In FIG. 3B, the sheets 108 in the second portion 112 are joined (e.g., welded) together as shown at 134. The joint 134, that is the location where the sheets 108 in the second portion 112 are joined or welded together, is connected to the heat sink 106. The joint 134 provides a zone of very high thermal conductivity along the through-plane direction 120 in which to transfer heat to the heat sink 106. Further, a conductive paste may be used between the joint 134 and the heat sink 106 to further enhance the heat transfer from the sheets 108 in the second portion 112 to the heat sink 106.

Figure 4:
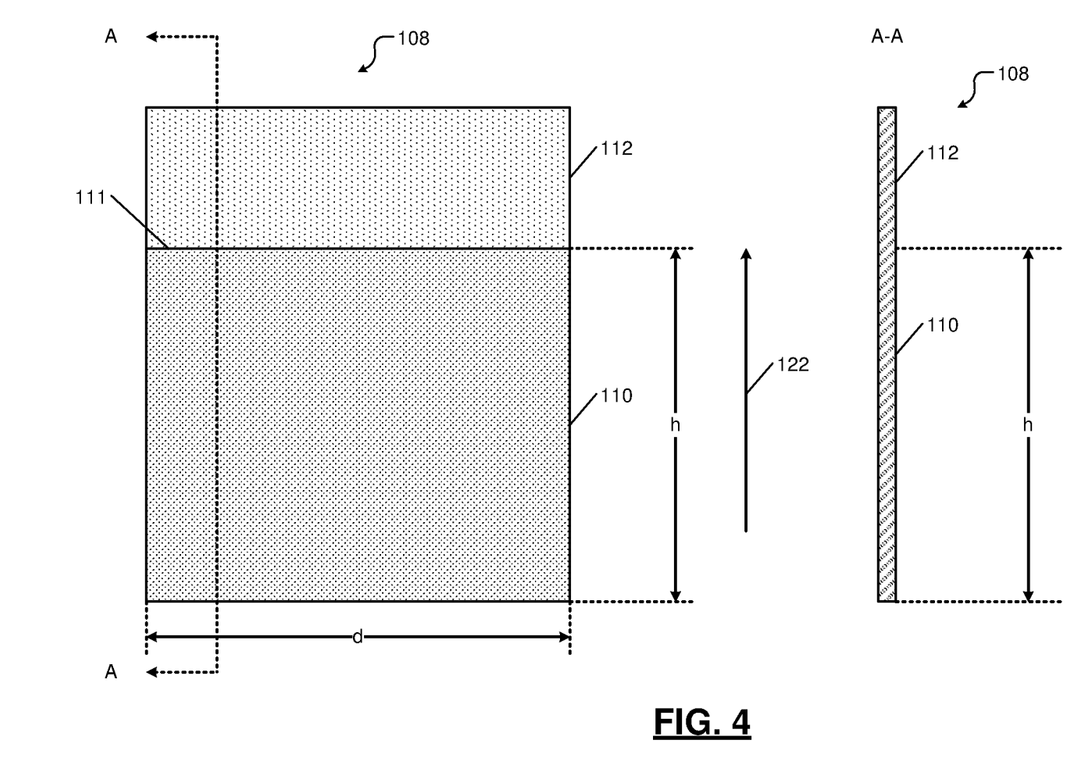
FIG. 4 shows an example of a surface of one of the sheets with different treatments performed on different portions of the surface.

FIG. 4 shows an example of one of the sheets 108 (hereinafter the sheet 108). Specifically, FIG. 4 shows a front view of the sheet 108 and also shows a cross-sectional view of the sheet 108 taken along the line A-A, which is seen in FIGS. 1A-3B. In the front view, the dimensions d and h respectively denote the depth and height of the cells 102, 104, of which the height h is shown in FIGS. 1A-2.

The sheet 108 has a first portion 110 that is disposed between the cells 102, 104. The sheet 108 has a second portion 112 that is disposed between the heat sink 106 and the cell 102. The sheet 108 is folded at 111 at about right angle to form the first and second portions 110, 112. These portions are already described above as respective portions of the sheets 108 stacked together. Various surface treatments of these portions are now described in further detail. The description provided with reference to FIG. 1A applies to all of the sheets 108 shown and described above with reference to FIGS. 1A-3B. Further, while a third portion 132 of the sheet 108 is not shown, it is to be understood that the third portion 132 of the sheet 108 is identical to the first portion 110 of the sheet 108.

The first portion 110 of the sheet 108 may be treated in a manner to increase the surface roughness and to increase the thermal contact resistance. The second portion 112 of the sheet 108 may be treated in a manner to decrease the surface roughness and to decrease the thermal contact resistance. Surface roughness can be increased in many ways. For example, to increase surface roughness, the first portion 110 of the sheet 108 can be brushed, wrinkled, or creased. To decrease surface roughness, the second portion 112 of the sheet 108 may be smooth (or less rough than the first portion 110).

To further increase the thermal contact resistance, instead of or in addition to wrinkling, the first portion 110 of the sheet 108 may be treated using a surface treatment. For example, the first portion 110 of the sheet 108 may be coated with a thin layer of an insulating material. For example, the thin layer may include an anodized coating. The second portion 112 of the sheet 108 is not coated using such a surface treatment. Instead, a conductive paste may be used to join the second portion 112 of the sheet 108 to the heat sink 106 to enhance heat transfer from the second portion 112 of the sheet 108 to the heat sink 106.

In FIG. 4, the difference in roughness between the first and second portions 110, 112 of the sheet 108 and the presence and absence of the coating on the first and second portions 110, 112 of the sheet 108 are shown using two different types of shading. A line denoted by reference numeral 111 shown between the two types of shading (i.e., between the first and second portions 110, 112 of the sheet 108) represents the fold 111 where the sheet 108 is folded at about right angle to form the first and second portions 110, 112 of the sheet 108. Further, while only one side of the sheet 108 is shown, it is understood that the other side of the sheet 108, which is not shown, may be identical or similar to the side shown in FIG. 4.

Figure 5:
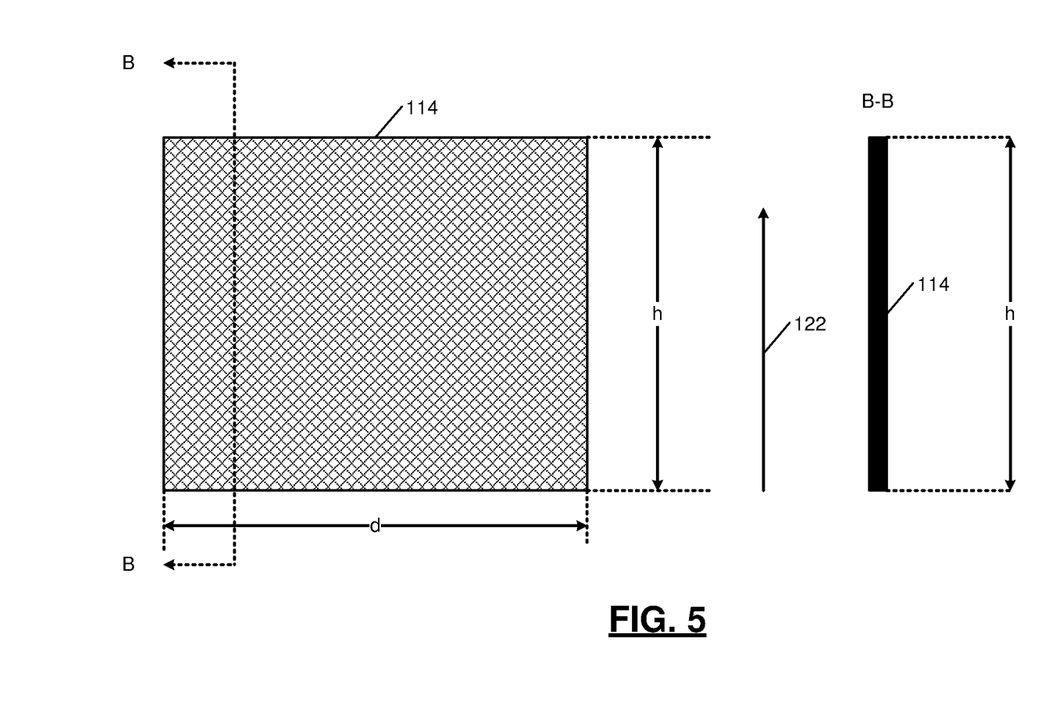
FIG. 5 shows an example of a layer of a thermally insulating material that can be disposed between two or more of the sheets shown in FIGS. 1A and 1B.

FIG. 5 shows an example of the layer 114 of insulating material shown in FIGS. 1A-3B. Specifically, FIG. 5 shows a front view of the layer 114 and also shows a cross-sectional view of the layer 114 taken along the line B-B, which is seen in FIGS. 1A-3B. In the front view, the dimensions d and h respectively denote the depth and height of the cells 102, 104, of which the height h is shown in FIGS. 1A-2.

For example, the layer 114 can comprise a mesh of an insulating material. For example, the layer 114 comprise fiber glass. For example, the layer 114 can comprise a thin sheet of any thermally insulating material. The thin sheet may be solid or porous (i.e., can include air pockets). The thin sheet can include any regular or irregular pattern of holes.

Note that the layer 114 is optional. The layer 114 can be used between every pair of the sheets 108 in the first portion 110. The layer 114 can be between any of the sheets 108 in the first portion 110 used using any regular or irregular pattern. The layer 114 can be used instead of or in addition to the thin coating of an insulating material applied to the sheets 108 in the first portion 110. The layer 114 is not used in the second portion 112.

Throughout the present disclosure, references have been made to insulating and conductive materials. The insulating and conductive properties of these materials are to be understood in the context of the ability or inability of these materials to conduct and transfer heat. An insulating material is to be understood as being thermally insulating, and a thermally conductive material is to be understood as being thermally conductive.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A heat transfer system comprising:
   first and second battery cells arranged adjacent to each other;
   a heat sink arranged adjacent to the first and second battery cells; and
   a plurality of sheets of a thermally conductive material arranged in a stack along a length of the first and second battery cells, the thermally conductive material comprising a same material directly contacting each other along the length of the of the first and second battery cells, a first portion of the stack disposed between the first and second battery cells, and a second portion of the stack disposed adjacent to and in thermal communication with the heat sink;
   wherein the first portion of the stack conducts heat from the first battery cell while limiting heat conducted to the second battery cell; and
   wherein the second portion of the stack transfers the heat to the heat sink.

2. The heat transfer system of claim 1 wherein the sheets are configured to provide a higher thermal contact resistance in the first portion of the stack than in the second portion of the stack.

3. The heat transfer system of claim 1 wherein the first portion of the stack is configured to function as a thermal insulator across a thickness of the first portion of the stack and as a thermal conductor in a direction perpendicular to the thickness of the first portion of the stack.

4. The heat transfer system of claim 1 wherein portions of the sheets in the first portion of the stack have a greater surface roughness than portions of the sheets in the second portion of the stack.

5. The heat transfer system of claim 1 wherein portions of the sheets in the first portion of the stack are coated with a material that is thermally insulating or that increases contact resistance of the sheets in the first portion, and wherein portions of the sheets in the second portion of the stack are not coated with the material or are coated with another material that decreases contact resistance of the sheets in the second portion.

6. A heat transfer system comprising:
   first and second battery cells arranged adjacent to each other;
   a heat sink arranged adjacent to the first and second battery cells; and
   a plurality of sheets of a thermally conductive material arranged in a stack, a first portion of the stack disposed between the first and second battery cells, and a second portion of the stack disposed adjacent to and in thermal communication with the heat sink;
   wherein the first portion of the stack conducts heat from the first battery cell while limiting heat conducted to the second battery cell;
   wherein the second portion of the stack transfers the heat to the heat sink; and
   wherein the sheets in the second portion of the stack are arranged in a staggered manner with a portion of each of the sheets contacting the heat sink.

7. The heat transfer system of claim 6 further comprising one or more sheets of a thermally insulating material disposed between two or more of the sheets in the first portion of the stack and wherein the second portion of the stack does not include any thermally insulating material between the sheets.

8. The heat transfer system of claim 1 wherein the sheets in the second portion of the stack are joined together to form a joint and wherein the joint is attached to the heat sink.

9. The heat transfer system of claim 1 further comprising a layer of a thermally conductive paste disposed between the heat sink and at least a portion of at least one of the sheets in the second portion.

10. The heat transfer system of claim 7 wherein the sheets are made of two or more different materials with relative positions of the sheets made of the two or more different materials in the stack being of any combination.

11. The heat transfer system of claim 1 wherein the second portion of the stack is compressed with a greater force than the first portion of the stack.

12. The heat transfer system of claim 5 wherein the material includes an anodized coating.

13. The heat transfer system of claim 6 wherein the thermally insulating material includes a porous material.

14. The heat transfer system of claim 10 wherein the two or more different materials include first and second metals.

15. The heat transfer system of claim 10 wherein the two or more different materials include a metal and a non-metal.

16. The heat transfer system of claim 7 wherein one or more of the sheets closer to the first battery cell are made of a material having a lower thermal conductivity than one or more of the sheets farther from the first battery cell.

17. The heat transfer system of claim 1 wherein:
the first and second battery cells are arranged in a battery module along a first axis;
the heat sink extends along the first axis;
the first portion of the stack extends along a second axis that is perpendicular to the first axis; and
the second portion of the stack extends along the first axis.

18. The heat transfer system of claim 17 wherein the first portion of the stack has a higher thermal contact resistance along the first axis than along the second axis.

19. The heat transfer system of claim 17 wherein the first portion of the stack conducts more heat along the second axis than along the first axis.

20. The heat transfer system of claim 1 wherein the heat sink is arranged on a first side of the first and second battery cells, the heat transfer system further comprising:
a second heat sink arranged on a second side of the first and second battery cells that is opposite to the first side;
wherein the stack of the sheets further comprises a third portion that is disposed between the second heat sink and at least one of the first and second battery cells; and
wherein the third portion of the stack transfers the heat conducted by the first portion of the stack from the first battery cell to the second heat sink.

* * * * *